United States Patent Office 3,057,145
Patented Oct. 9, 1962

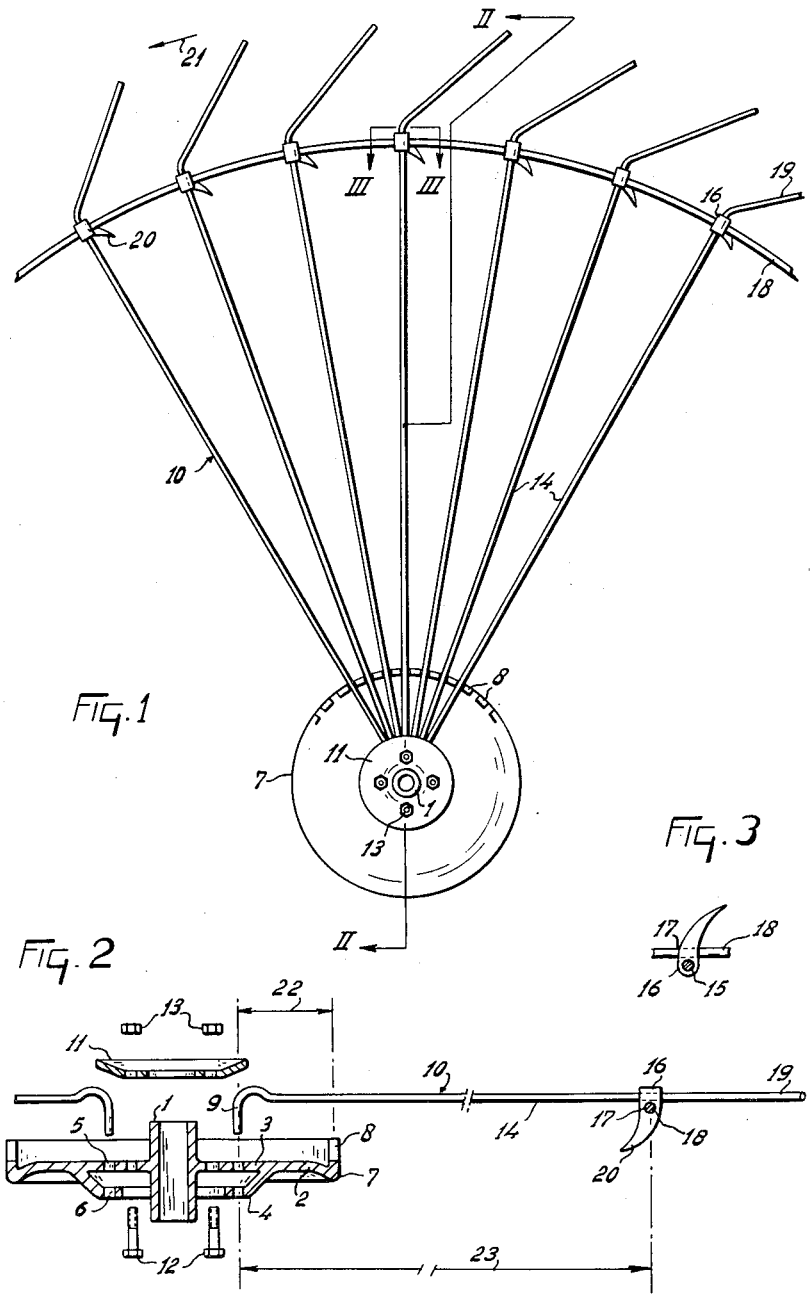

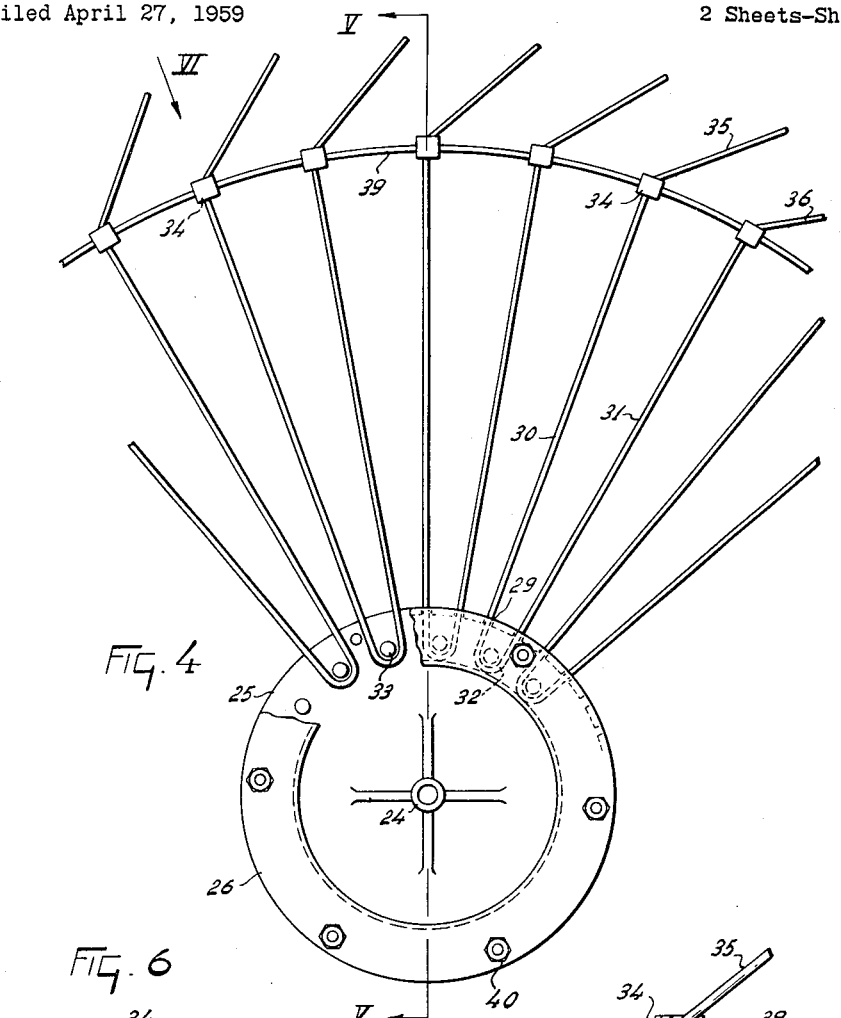
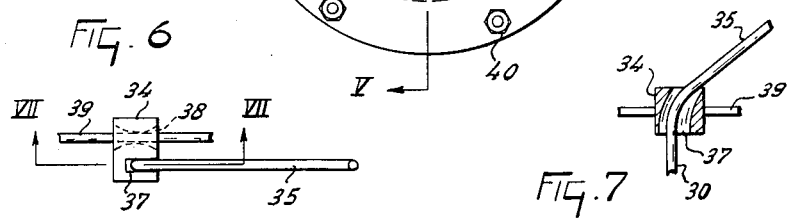
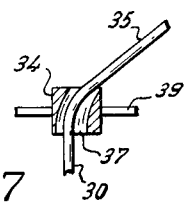
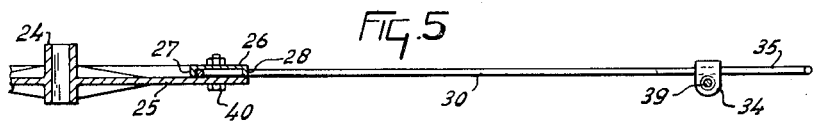

3,057,145
RAKE WHEELS
Cornelis van de Lely, 10 Weverskade,
Maasland, Netherlands
Filed Apr. 27, 1959, Ser. No. 809,021
Claims priority, application Netherlands Dec. 24, 1958
21 Claims. (Cl. 56—377)

This invention relates to rake wheels having circumferential resilient tines. The term "tine" is hereinafter used to refer not only to a crop-engaging element, but to any prolongation or extension thereof by which such element is connected in the associated rake wheel.

It is an object of the invention to provide an improved rake wheel construction.

In accordance with the invention, there is provided a rake wheel having circumferential resilient tines, wherein the tines are secured to the hub of the rake wheel and extend outwardly to locations where they are individually supported in bearing elements forming separate units, the tines being turnable in said elements. The term "hub" is hereinafter used not only to refer to the nave of the wheel but to any central part of the wheel to which the tines are connected.

For a better understanding of the invention and to show how the same may be carried into effect, reference will now be made, by way of example, to the accompanying drawings in which:

FIGURE 1 is an elevation of a part of a first embodiment of the invention,

FIGURE 2 is a section on enlarged scale taken on line II—II of FIG. 1,

FIGURE 3 is a section taken on line III—III of FIGURE 1, also on enlarged scale, FIGURE 4 is an elevation of part of a second embodiment of the invention, FIGURE 5 is a section taken on line V—V of FIGURE 4, FIGURE 6 shows, on enlarged scale, a detail of the rake wheel shown in FIGURE 4, viewed in the direction of the arrow VI, and FIGURE 7 is a section taken on line VII—VII of FIGURE 6.

As shown in FIGURES 1 to 3, the rake wheel according to the first embodiment of the invention includes a hub 1, on which is arranged a flange 2, the plane of which is at right angles to the axis of the hub 1. The flange 2 comprises two spaced portions 3 and 4.

The portion 3 has holes 5, and the portion 4 has holes 6 aligned with the holes 5. The outer periphery 7 of the flange 2 is bent over and constitutes a ring which is concentric with the hub 1 and in which slots 8 are formed. The ring is spaced from the outer periphery of a plate 11. The ends 9 of tines 10 are arranged in the holes 5 and 6 and are retained therein by the plate 11 which is secured to the flange 2 by means of bolts 12 and nuts 13. The tines 10 have portions 14, which extend radially from the axis of the wheel and are thus directed away from the hub. The portions 14 pass through holes 15 in independent bearing elements or supports 16 disposed near the circumference of the wheel and forming separate units. Each hole 15 acts as a bearing for a tine, and the length of the hole is appreciably greater than (e.g. about three times) the thickness of the tine in the bearing. This arrangement reduces the wear on the tine.

The supports 16 also have cylindrical holes 17, whose axes are approximately perpendicular to the axes of the holes 15. Located in these holes 17 is a flexible wire rim 18. The tines 10 have portions 19, which are, beyond the supports 16 bent backwardly with respect to the direction (indicated by the arrow 21) of rotation of the wheel. The supports 16 are provided with extensions 20, in the form of fingers on the forward side of the wheel which fingers are directed forwardly away from the supports 16 and are curved towards the axis of the wheel. These fingers are oriented backwardly with respect to the direction of rotation 21 of the wheel, similarly to the portions 19 of the tines 10. The supports 16, which may be made as castings or die-castings are displaceable along the rim 18 so that the tines 10 arranged in the supports are movable relatively to each other near the circumference of the wheel. The portions 19 of the tines 10 are capable of turning about the center lines of the portions 14 with a resulting torsional deflection of these portions 14. Thus the portions 14 will turn in the holes 15 of the supports 16, so that the supports constitute bearings for the tines. The rim is capable of displacement, relative to the tines, through the supports. In the rake wheel thus formed the tines can readily deflect individually, so that, when this rake wheel is employed on stony ground, the stones can easily escape between the tines. The tines can be pushed aside by the stones, without unduly stressing the tines. The slots 8 are located at a distance indicated at 22 from the portion 9 of the tine, which is at least one eighth of the distance 23 of the rim 18 from the portion 9. The slots 8 are just wide enough to allow the tines 10 to fit therein so that a tine cannot turn about the axis of the holes 5 and 6 in which it is located. When the support 16 is displaced along the rim 18, the portion 14 will be constrained to a bent position and, when the constraint is removed, the tine will return to its initial position. Since the fingers 20 are orientated towards the axis of the wheel, they tend to lift the crop located in front of the rake wheel. Thus the crop will to some extent be lifted from the ground immediately in front of the rake wheel and will not unduly force backwardly the portions 19 of the tines.

As shown in FIGURES 4 to 7, a rake wheel according to the second embodiment of the invention includes a hub 24, on which a flange 25 is arranged. Around the outer edge of the flange 25 is secured an annulus 26 which has bent-over edges 27 and 28 which form concentric rings. Slots 29 for tines 30 and 31 are provided in the edge 28. The tines 30 and 31 are made from one piece of material, the portion 32, which forms an interconnection of the tines, being located around a pin 33 provided on the flange 25.

The tines 30 and 31 are arranged in independent elements or supports 34, near the circumference of the wheel, in which supports they are bent to constitute portions 35 and 36, oriented backwardly with respect to the direction of rotation of the wheel. The tines pass through holes 37 in the supports 34, the holes having a cross-section which is elongated in their direction of movement when the wheel rotates. The width of the holes, in a plane including the axis of rotation of the wheel, is approximately equal to the thickness of a tine. The curved portions of the tines adjacent the portions 35 and 36 are located in the holes 37, so that the tines cannot turn in the supports 34. The supports also have holes 38, in which is located a wire-like rim 39. Each hole 38 has a belled mouth at each end. Each support 34 is therefore capable of turning on the rim 39 about an axis which is radial to the wheel and which passes through the rim. The holes 38 are sufficiently large to allow the supports to be displaced along the rim 39.

As in the first embodiment, the arrangement is such that the tines can move relatively to each other near the circumference of the wheel, since the supports 34 are capable of displacement along the rim 39. The tine portions 35 and 36 can also turn out of the plane in which they are located when undeflected, such plane being at right angles to the axis of the rake wheel. During these movements the portions 35 and 36 and their supports 34 will turn about the longitudinal axes of the radial portions of the tines 30 and 31, with a resulting torsional deflection of these radial portions.

If desired, the supports 34 may be provided with members similar to the fingers 20 described in connection with the first embodiment. The tines 30 and 31 cannot move radially towards or away from the axis of the wheel, since the portions 32 are held between the pins 33 and the curved edge 27 of the annulus 26. Since the tines are also located in the slots 29 of the edge 28, the tines 30 and 31 cannot move laterally between the annulus 26 and the flange 25. Since the tines are secured in this manner between the annulus and the flange, the portions of the tines located between these members need not be clamped. The distance between the annulus 26 and the flange 25 may therefore be slightly greater than the thickness of a tine 30 or 31.

The annulus 26 and the flange 25 are secured together by bolts 40, the distance of the flange 25 from the annulus 26 being determined by the depth of the curved edges 27 and 28.

What I claim is:

1. A rake wheel comprising a hub, tines on and extending radially outwards from said hub, independently movable bearing elements respectively supporting said tines, and a rim connecting said bearing elements, said bearing elements defining holes in which said tines are positioned.

2. A wheel as claimed in claim 1, wherein the thickness of said rim is less than the length of said holes.

3. A wheel as claimed in claim 1 wherein said bearing elements are provided with further holes in which said rim is accommodated.

4. A wheel as claimed in claim 1 wherein said rim is a wire.

5. A wheel as claimed in claim 1 wherein said bearing elements are individually displaceable on said rim.

6. A wheel as claimed in claim 1 wherein said bearing elements are individually displaceable on said tines.

7. A wheel as claimed in claim 1 wherein said holes have elongated cross-sections.

8. A wheel as claimed in claim 7 wherein said tines include bent portions at least in part adjacent the elongated cross-sections.

9. A wheel as claimed in claim 1 wherein the bearing elements have holes for the tines which have bell-shaped mouths.

10. A wheel as claimed in claim 1 wherein said bearing elements comprise outwardly extending fingers.

11. A wheel as claimed in claim 10 wherein said wheel defines an axis of rotation and said fingers are curved towards said axis.

12. A wheel as claimed in claim 10 wherein said wheel has a normal direction of rotation and said fingers are curved rearwardly with respect to said direction.

13. A wheel as claimed in claim 1 comprising circular members on said hub and engaging said tines therebetween, one of the circular members being provided with slots spaced from the axis of rotation of the wheel, said tines being positioned in said slots.

14. A wheel as claimed in claim 13 wherein said slots are circularly disposed about said axis.

15. A wheel as claimed in claim 13 wherein the radially inward extent of the tines from said slots is at least one-eighth the length of said tines to said rim.

16. A wheel as claimed in claim 1 comprising, on said hub, a flange provided with holes substantially parallel to the axis of the wheel, said tines extending into the latter said holes.

17. A wheel as claimed in claim 16 comprising a plate on said hub, said plate locking the tines in the latter said holes.

18. A wheel as claimed in claim 1, comprising, on said hub, a flange having spaced and aligned holes, the tines extending into the latter said holes.

19. A rake wheel comprising radially extending tines, a rim defining a rake wheel plane, and bearing elements independently displaceable along said rim and engaging said tines to connect the latter to the rim.

20. A rake wheel comprising radially extending tines, a rim engaging and supporting said tines, said rim defining a rake wheel plane, and fingers coupled to said rim and protruding to one side of said plane whereby to engage, cooperatively with said tines, material to be raked.

21. A rake wheel comprising a hub, tines on and extending radially from said hub, a rim concentric with said hub, and bearing elements provided with perpendicularly arranged holes one of which accommodates said rim whereby the elements are supported on the rim and the other of which accommodates a tine whereby the tines are coupled to said rim.

References Cited in the file of this patent

FOREIGN PATENTS

| | | |
|---|---|---|
| 480,889 | Italy | May 13, 1953 |
| 536,671 | Italy | Dec. 7, 1955 |